United States Patent [19]
Carney et al.

[11] Patent Number: 5,940,384
[45] Date of Patent: Aug. 17, 1999

[54] WIDEBAND WIRELESS BASE STATION MAKING USE OF TIME DIVISION MULTIPLE ACCESS BUS HAVING SELECTABLE NUMBER OF TIME SLOTS AND FRAME SYNCHRONIZATION TO SUPPORT DIFFERENT MODULATION STANDARDS

[75] Inventors: Ronald R. Carney, Palm Bay; Thomas R. Schmutz, Melbourne; Terry L. Williams, Melbourne Beach, all of Fla.

[73] Assignee: AirNet Communications Corporation, Melbourne, Fla.

[21] Appl. No.: 08/740,153

[22] Filed: Oct. 28, 1996

Related U.S. Application Data

[63] Continuation of application No. 08/402,585, Mar. 13, 1995, Pat. No. 5,592,480.

[51] Int. Cl.⁶ .................................................. H04B 7/212
[52] U.S. Cl. ......................... 370/347; 370/320; 370/335; 370/342; 455/422
[58] Field of Search ........................... 370/320, 328, 370/335, 342, 347, 362, 484; 455/422

[56] References Cited

U.S. PATENT DOCUMENTS

| | | | |
|---|---|---|---|
| 5,592,480 | 1/1997 | Carney et al. | 370/347 |
| 5,640,385 | 6/1997 | Long et al. | 370/335 |

FOREIGN PATENT DOCUMENTS

| | | | |
|---|---|---|---|
| 0 439 926 A2 | 8/1991 | European Pat. Off. | H04Q 7/04 |
| 0 471 246 A2 | 2/1992 | European Pat. Off. | H04B 7/26 |
| 0 507 384 A2 | 10/1992 | European Pat. Off. | H04B 7/26 |
| 0 560 388 A1 | 9/1993 | European Pat. Off. | H04B 7/26 |
| 0 590 412 A1 | 4/1994 | European Pat. Off. | H04L 12/40 |
| 0 605 182 A2 | 7/1994 | European Pat. Off. | H04B 7/26 |
| 44 23 582 A1 | 1/1995 | Germany | H04B 7/26 |

*Primary Examiner*—Douglas W. Olms
*Assistant Examiner*—Shick Hom
*Attorney, Agent, or Firm*—Farkas & Manelli, PLLC; Russell O. Paige

[57] ABSTRACT

A wireless communication system basestation making use of a wideband, multichannel digital transceiver having incorporated therein a time division multiple-access (TDM) bus for providing digital samples of a plurality of wireless communication channels, wherein the time slot duration and frame rate of the TDM bus may be reconfigured. The invention allows various air interface standards, even those having different channel bandwidths, to be serviced by the same basestation, without having to install additional or different equipment, and by automatically redistributing signal processing resources, eliminating the need to reconfigure the basestation when different types of wireless signaling must be accommodated.

21 Claims, 9 Drawing Sheets

WIDEBAND WIRELESS BASE STATION MAKING USE OF TIME DIVISION MULTIPLE ACCESS BUS HAVING SELECTABLE NUMBER OF TIME SLOTS AND FRAME SYNCHRONIZATION TO SUPPORT DIFFERENT MODULATION STANDARDS

This is a continuation of application Ser. No. 08/402,585 filed on Mar. 13, 1995 now U.S. Pat. No. 5,592,480.

FIELD OF THE INVENTION

This invention relates generally to communication networks, and in particular to a wireless communication system basestation making use of a wideband, multichannel digital transceiver having incorporated therein a time division multiple-access (TDM) bus for providing digital samples of a plurality of wireless communication channels, wherein the TDM bus has a selectable number of time slots per frame, and a selectable frame synchronization rate, to permit dynamic allocation of modulator and demodulator signal processing resources, and to support wireless modulation standards of different bandwidths.

BACKGROUND

The basestations used by the providers of current day multiple channel wireless communication services, such as cellular mobile telephone (CMT) and personal communication systems (PCS), typically designate signal processing equipment for each single receiver channel. This is probably a result of the fact that each basestation is configured to provide communication capability for only a limited predetermined number of channels in the overall frequency spectrum that is available to the service provider.

A typical basestation may thus contain several racks of equipment which house multiple sets of receiver and transmitter signal processing components that service a prescribed subset of the available channels. For example, in an Advanced Mobile Phone Service (AMPS) cellular system, a typical basestation may service a pre-selected number of channels, such as 48, of the total number, such as 416, of the channels available to the service provider.

Certain types of wireless service providers would prefer, however, to employ equipment that would be more flexible, both in terms of where it can be located, as well as in the extent of the available bandwidth coverage provided by a particular transceiver site. This is particularly true in rural areas where cellular coverage may be concentrated along a highway, and for which the limited capacity of a conventional 48 channel transceiver may be inadequate. This may also be true in other instances, where relatively large, secure, and protective structures for multiple racks of equipment are not necessarily available or cost effective, such as for PCS applications.

One way to resolve this difficulty is to implement a basestation transceiver using a high speed analog-to-digital (A/D) converter and equipment which makes use of efficient digital filtering algorithms such as the Fast Fourier Transform (FFT), to separate the incoming signal energy into multiple ones of the desired channels. On the transmit side, this basestation implementation includes an inverse FFT processing combiner which outputs a combined signal representative of the contents of the communication channel signals processed thereby. In this manner, relatively compact, lightweight, inexpensive, and reliable digital integrated circuits may be used to cover the entire channel capacity offered by the service provider, rather than only the subset of the available channels.

Thus unlike prior art basestations, the wideband digital basestation is capable of receiving any channel. While this provides a certain number of advantages as described above, it also poses a number of unique problems to the service provider.

Perhaps most importantly, there exists a need to efficiently support a varying number of active channels and the required connections into the public switched telephone network.

These connections should be made in such a way as to simplify call control. Indeed, it would be desirable for as many of the call set up control functions required by such a basestation were handled to the maximum extent possible by the basestation itself.

By so simplifying the network interface, the Mobile Telephone Switching Office (MTSO) and/or Mobile Switching Center (MSC) through which the basestation is connected to the Public Switched Telephone Network (PSTN) may be freed, as much as possible, from the details of maintaining a proper connection from the PSTN to the remote subscriber unit.

Secondly, the basestation should make efficient use of the available resources to process each call. In particular, while the wideband channelizer separates the signals into channels, certain other signal processing resources such as demodulators and modulators are also required.

Using the wideband front end, any channel in the bandwidth available to the service provider is available at any time. However, it is desirable for such a basestation to only activate as many of the other, per-channel resources as is required to support the present call density.

By making the basestation's implementation of call processing resources as modular as possible, the basestation could initially be configured to support a limited number of channels. Then, as the demand for services grows, additional channels could be supported by the addition of the necessary resources.

In other instances, the basestation should be reconfigurable in the event of an change or expansion in one type of service. For example, given the emergence of several air interface standards such as code division multiple access (CDMA) as well as time division multiple access (TDMA) standards for cellular, it is desirable for a given wideband basestation to be able to support each such standard, thereby reducing the number of such basestations that need to be deployed. However, it would be desirable if the resources allocated to one particular air interface, when no longer needed, could then be made available to process signals formatted using the other air interface. That is, as the demands of one type of service or the other come and go, the basestation should be automatically reconfigured, without requiring an investment in new or different basestation resources.

Thus, several difficulties exist with a wideband digital basestation that can process at any time, any one of many channels in the RF bandwidth available to a service provider.

SUMMARY OF THE INVENTION

Briefly, the invention is a wideband transceiver basestation for a wireless communication system. The receiver portion of the basestation includes a digital channelizer which provides digital samples of multiple wireless channel signals, and a time division multiplexed (TDM) data bus, to provide switching functionality between the various channel outputs and other basestation receiver resources such as digital demodulators.

On the transmitter side, basestation signal processing resources such as digital modulators are also connected to a multichannel digital combiner over the TDM bus. Thus, the same flexibility in switching functionality is provided between transmitter signal processing resources and the transmitter channel inputs.

A synchronization and clock generation circuit has the capability of selecting the number of time slots, as well as the bus frame rate, to be used on the TDM bus. The number of time slots and the bus frame rate depend upon, respectively, the number of the channel signals and the bandwidth of each of the channel signals provided by the channelizer.

More particularly, the wideband basestation transceiver includes a receive antenna and one or more digital tuners that provide wideband digital signal energy to a digital channelizer. The digital channelizer, in turn, produces a plurality of channel signals, with each channel signal representing the signal energy in one of the radio frequency channels. The channel signals each consist of a series of digital samples.

The digital samples of each channel signal are, in turn, connected to a time division multiplex (TDM) bus. A basestation controller grants access to the TDM bus by each channel signal in a predetermined timeslot, in a predetermined order.

The samples of the digital channel signals are then forwarded to an available one of the associated receiver resources, such as a demodulator. The demodulators, typically implemented in a digital signal processor (DSP), are then connected to an outgoing landline such as a T1 line to a telephone switching office (MTSO) or mobile switching center (MSC) for further connection into the PSTN.

Accordingly, when the basestation is to support a particular number of channel signals simultaneously, each channel signal having a bandwidth as dictated by a particular modulation or air interface standard to be supported, the TDM bus reconfigured accordingly, to provide the required number of bus time slots, as well as the frame repeat rate required to support the desired per-channel sampling rate.

When it is desired that the basestation support a protocol which has a larger number of narrower bandwidth channels, the bus timing circuits are reconfigured to provide a correspondingly larger number of time slots at a slower frame rate, and, likewise, when the basestation is to support a protocol which has a smaller number of wider bandwidth channels, the bus timing circuits are again reconfigured to provide a smaller numnber of time slots at a higher frame rate.

As a result of the switching functionality provided by the TDM bus, the basestation is thus capable of supporting different signalling protocols, or air interface standards, which have different channel bandwidths.

The invention provides other advantages as well.

For example, the basestation may efficiently service both code division multiple access (CDMA) and time division multiple access (TDMA) signals at the same time. In such an arrangement, there are at least two digital channelizers, with one allocated to separating the incoming RF energy into the channel bandwidths required by TDMA, and another channelizer dedicated to separating the energy into the bandwidth required by CDMA. As the channels are activated, they are then serviced by the pool of demodulator resources, by allocating the correct number of additional time slots to accommodate each standard.

If, for example, a wideband CDMA mobile unit goes off line, the timeslots as modulators and demodulators freed thereby can be allocated to processing TDMA signals. This results in automatic on-demand redistribution of basestation resources to one signaling standard or another, without intervention by an MTSO, MSC, or the service provider in any way.

Such a system architecture also exhibits scalability, in the sense that additional DSP processors may be added to support additional channels as traffic increases, without having to change the RF front configuration. This is unlike the prior art, where each basestation had a fixed channel allocation, and, to add capacity, one must add additional narrowband receivers and transmitters.

As a result, a basestation according to the invention permits a wireless service provider much greater flexibility in planning implementations, as different and even future protocols can be supported.

BRIEF DESCRIPTION OF THE DRAWINGS

For a fuller understanding of the advantages provided by the invention, reference should be had to the following detailed description together with the accompanying drawings, in which.

DETAILED DESCRIPTION OF A PREFERRED EMBODIMENT

Figure 1:
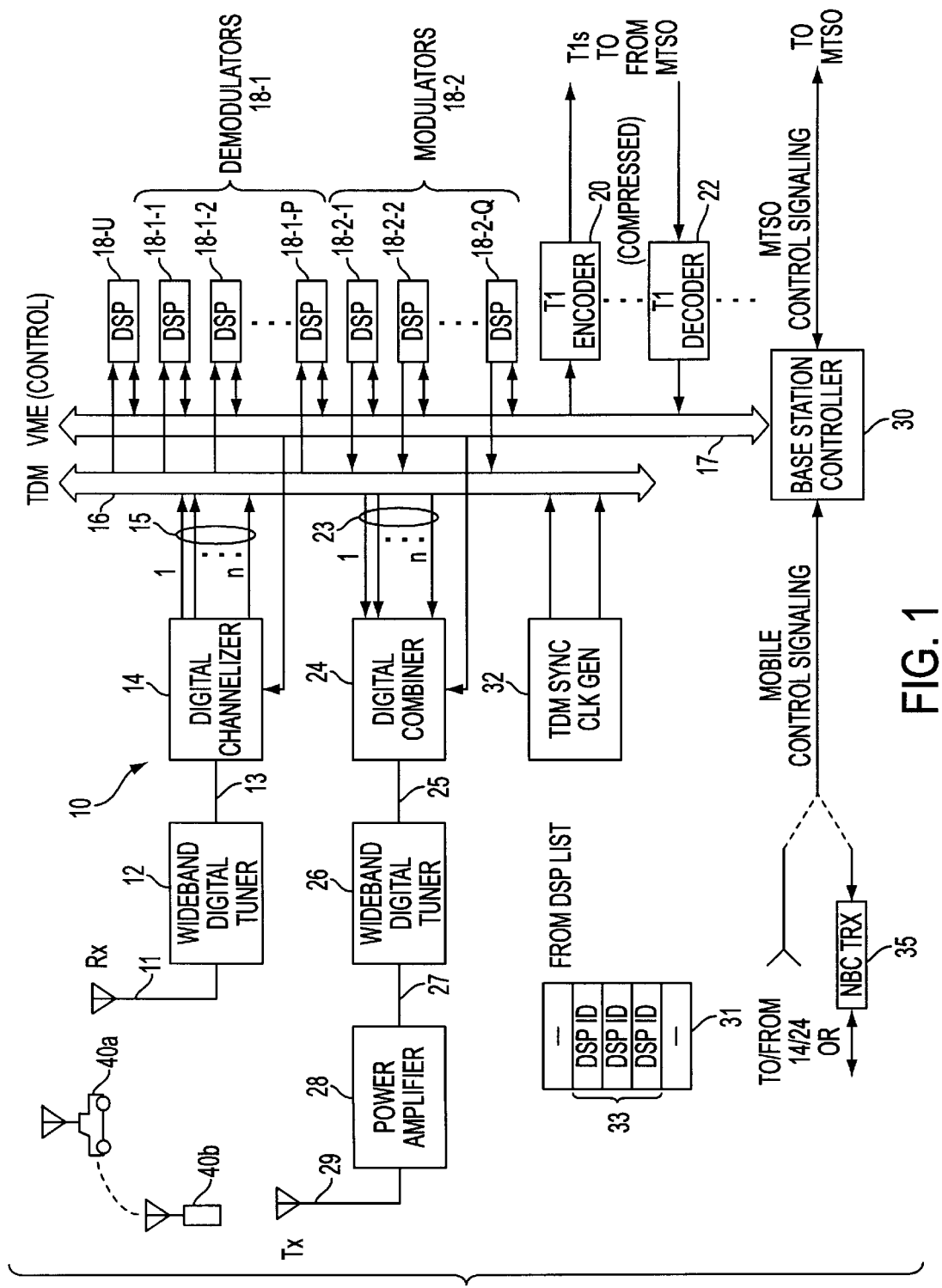
FIG. 1 is a block diagram of wideband digital basestation making use of a time division multiplex (TDM) bus according to the invention.

FIG. 1 is a block diagram of a wideband wireless digital basestation 10 according to the invention. Briefly, the basestation 10 consists of a receive antenna 11, one or more wideband digital tuners 12, one or more digital channelizers 14, a time division multiplex (TDM) bus 16, a control bus 17, a plurality of digital signal processors (DSPs), a first subset of which are programmed to operate as demodulators 18-1-1, 18-1-2, . . . , 18-1-P (collectively, demodulators 18-1); a second subset of which are programmed to operate as modulators 18-2-1, 18-2-2, . . . , 18-2-Q; and a third subset 18-u of which are presently idle, transport signal (T-1) encoder 20, a T-1 decoder 22, one or more digital combiners 24, one or more wideband digital exciters 26, a power amplifier 28, a transmit antenna 29, a basestation control processor (controller) 30, and a TDM synchronization clock generator 32.

More particularly, the basestation exchanges radio frequency (RF) signals with a number of mobile subscriber terminals (mobiles) 40a, 40b. The RF carrier signals are modulated with voice and/or data (channel) signals which are to be coupled to the public switched telephone network (PSTN) by the basestation 10. The particular modulation in used may be any one of a number of different wireless (air interface) standards such as the well known Advanced Mobile Phone Service (AMPS), time division multiple access (TDMA) such as IS-54B, code division multiple access (CDMA) such as IS-95, frequency hopping standards such as the European Groupe Speciale Mobile (GSM), personal communication network (PCN) standards, and the like. Indeed, in a manner that will be described below, the basestation 10 may even be configured to simultaneously process RF signals formatted according to more than one such air interface at the same time.

On the receive side (that is, with respect to the basestation 10), RF modulated signals are first received at the receive antenna 11, and forwarded to the wideband digital tuner 12. The digital tuner 12 downconverts the RF signal received at the antenna to a intermediate frequency (IF) and then performs an analog to digital (A/D) conversion to produce a digital composite signal 13.

Digital tuner 12 is wideband in the sense that it covers a substantial portion of the bandwidth available to the wireless service provider who is operating the basestation 10. For example, if the air interface implemented by the basestation 10 is IS-54B, the wideband digital tuner may downconvert as much as a 12.5 MegaHertz (MHz) bandwidth in the 800–900 MHz range which contains as many as 416 receive and transmit channel signals, each having an approximately 30 kiloHertz (kHz) bandwidth.

The digital channelizer 14 implements a channel bank to separate the downconverted composite digital signal 13 to a plurality, N, of digital channel signals 15.

This digital sampled signal is then further filtered to separate it into the individual 30 kHz channel signals. The digital channelizer 14 can thus be considered as a bank of digital filters with each filter having a 30 kHz bandwidth. The digital channelizer 14 may implement the filter bank using any of several different filter structures, and no particular digital filter structure is critical to the operation of the invention. However, in one preferred embodiment, the digital channelizer 14 consists of a set of convolutional digital filters and a Fast Fourier Transform (FFT) processor. The convolutional digital filters make use of multirate digital filter techniques, such as overlap and add, or polyphase, to efficiently implement a digital filter bank by grouping samples of the downconverted signal together, multiplying the sample groups by a convolutional function, and then forwarding the samples to the FFT for conversion into the n individual channel signals. Such filter banks may implemented using any of the techniques as are described in the textbook by Crochiere, R. E., and Rabiner, L. R., entitled "Multirate Digital Signal Processing" (Englewood Cliffs, N.J.: Prentice-Hall, 1983), pages 289–399.

In any event, the channelizer 14 provides N individual digital channel signals 15, wherein each of the N outputs represent information in one of the radio frequency channels originated by the mobile 40. Usually, one-half of the channels are used for transmitting signals and one-half for receiving signals. Thus, in the IS-54B example being described, N is 208, and thus there are 208 receive and 208 transmit channels implemented by the basestation 10.

These N digital channel signals are then provided over the time division multiplex (TDM) bus 16 to a plurality of digital signal processors (DSPs) 18-1-1, 18-1-2, ..., 18-1-P (collectively, demodulator-DSP 18-1). In a manner that will be understood in greater detail shortly, the TDM bus 16 operates as a time division multiplexed cross-bar switch. That is, any one of the N digital channel signals 15 may be connected to any one of the demodulator DSPs 18-1 via the TDM bus 16.

The exact nature of the timing of the TDM bus 16, that is, the number of time slots available for eaech frame of data samples output by the digital channelizer 14, and thus the manner in which the N digital channel signals are transferred over the TDM bus 16, changes depending upon the number of channel signals, N. The manner in which the basestation 10 accomodates these changes in the timing of the TDM bus 16 will be decribed in greater detail below.

The DSPs 18-1 are each programmed to remove the modulation on each channel signal 15 as specified by the air interface standard supported by the basestation 10. There typically is not a one-to-one correspondence between the number of DSPs 18-1 and the number of channel signals, N, provided by the channelizer 14. For example, the DSPs may each process a number, such as 24, of digital channel signals 15 at the same time.

The basestation controller 30, using the VME bus and TDM synchronization clock generator 32, manages access by individual digital channel signals 15 to the TDM bus 16, in a manner that will be described shortly.

The outputs of the digital signal processors 18-1, representing demodulated audio or data signals, are then forwarded over the VME bus 17 to the encoder 20. The VME bus 17 is a well known industry standard relatively high frequency bus for interconnecting digital processors and components.

The encoder 20, in turn, reformats the demodulated signals as necessary for transmission to a local Mobile Telephone Switching Office (MTSO). The demodulated signals may be reformatted according to any one of a number of well-known time multiplex telephone signal transport protocols, such as the so-called T1 span (or E1). The T1 signals are then processed by the MTSO in an known fashion, to ultimately complete a telephone call from the subscriber unit 40 to a desired destination, such as another telephone subscriber who is connected to the Public Switched Telephone Network (PSTN).

Since each T1 span has a limited capacity, there may be more than one T1 signal necessary to accommodate all of the channels serviced by the basestation 10. In the example being discussed, each T1 signal may be formatted to carry up to 96 IS-54B bandwidth-compressed signals to the MTSO, assuming that the demodulated signals remain as compressed audio. Thus, as few as five T1 lines can be used to carry all of the 416 transmit and receive channels. When not all of the channels are busy, however, on as many of the T1 line resources as are necessary are connected to the MTSO, in a manner that will be understood shortly.

In other words, the demodulated signals output by the DSPs 18-1 may each be sub-rate (e.g., sub-DS0 frequency signals) which still contain additional encoding other than the air interface standard, such as impressed by a bandwidth compression scheme, which is not removed by the basestation 10. Rather, to minimize the required number of time slots used by the T1 signals, such compression may be removed at the MTSO.

The signal flow on the transmit side of the basestation 10 is analogous. Signals are received from the MTSO and provided to the T1 decoder 22, which removes the T1 formatting.

The unformatted T1 signals are then coupled to the DSPs 18 over the bus 17. A subset of the DSPs 18-2-1, 18-2-2, . . . , 18-2-Q (collectively, modulators 18-2) then modulate these signals and presents them to the TDM bus 16. Ultimately, these are then each coupled to one of the N digital channel signals 23 input to the combiner 24. As was true in the receive direction, being a cross-bar swtich, the TDM bus 16 permits any one of the modulator DSPs 18-2 to be connected to any one of the channel signal inputs 23.

Although each modulator DSP 18-2 typically processes multiple channel signals, each such channel signal generated by the modulator DSP 18-2 is typically assigned one or more unique time slots on the TDM bus 16, with no two channel signals thus occupying the same time slot. Similarly, no two channel signals on the receive side ever occupy the same timeslot on the TDM bus 16.

As for the demodulators DSPs 18-1, the number of time slots assigned per frame on the TDM bus 16 varies, depending upon the channel bandwidth of the moduation standard implemented.

Other DSPs 18-u may be unused at a particular point in time. However, these unused DSPs remain as an available resource to the basestation 10, should a new mobile 40 request access. The manner in which DSPs are allocated at the time of setting up a call will be described in detail below.

The digital combiner 24 combines the TDM bus outputs to produce a composite IF digital signal 25 representing the N channels to be transmitted. The digital combiner 24 then feeds this combined signal to a digital exciter 26, which generates an RF signal 27. This RF signal 27 is then amplified by the power amplifier 28 and fed to the transmit antenna 29.

In order to set up each call, the basestation control processor 32 must exchange certain control information with the MTSO. For example, when a mobile unit 40 wishes to place a call, the mobile unit 40 indicates this by transmitting on one or more control signal channels. These control signals may be exchanged in one of several ways. As shown, the control signals may be in-band or out of band signals present in one or more of the channel signals output by the channelizer 14 or input to the combiner 24. Alternatively, a separate control signal transceiver 35 may be used to receive and transmit such control signaling.

In either event, the basestation 10 forwards the request for access by the mobile 40 to the MTSO, to set up the end to end connection. Upon receiving an indication from the MTSO that the connection can be made at the remote end, the basestation 10 then performs a number of steps, to insure that the appropriate data path through the TDM bus is then enabled to support communication with between the newly enabled mobile 40 and the MTSO.

For example, the MTSO typically returns a pair of T1 span line and T1 time slot identifiers. These inform the basestation controller 30 on which outgoing T1 line and time slot to place the received signal, and on which incoming T1 line and time slot it can expect to obtain the transmit signal for the mobile 40.

Figure 2:
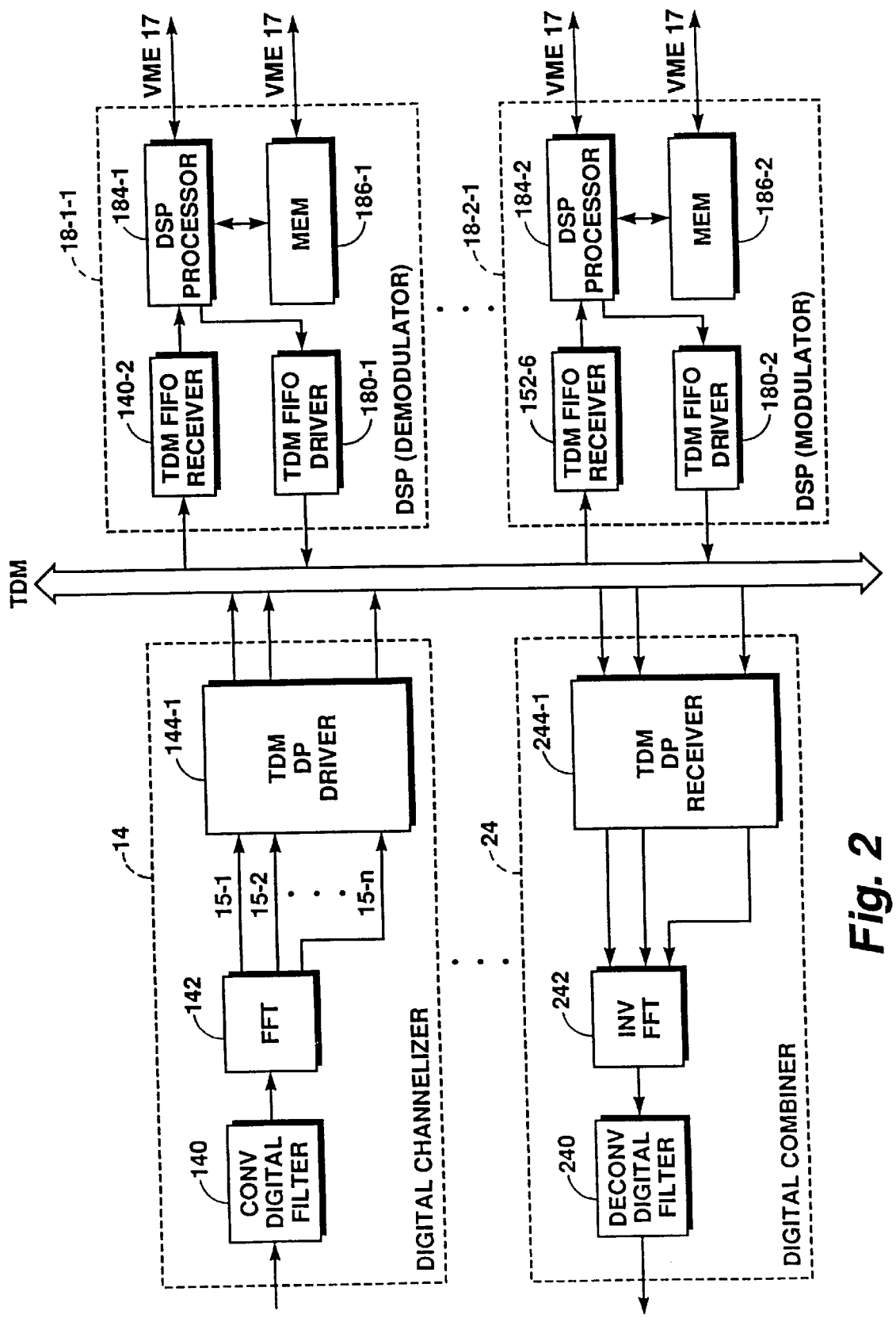
FIG. 2 is a more detailed block diagram showing addressable bus drivers and receivers which permits access to the TDM bus.

However, before proceeding with a detailed explanation of this call set-up process, a bit more detail of the operation of the TDM bus 16 will be provided. As shown in FIG. 2, the digital channelizer 14 consists of a convolutional digital filter 140, a fast Fourier transform (FFT) 142, as well as a TDM dual port (DP) driver 144.

The operation of the convolutional filter 140 and FFT 142 is not critical to the present invention, and is explained in the co-pending application. It is sufficient here to say that the convolutional filter 140 and FFT 142 make use of multirate digital signal processing techniques, such as overlap and add or polyphase, to efficiently implement a digital filter bank by (1) grouping samples of the downconverted signal 13 together and multiplying them by a weighting function, and then (2) forwarding them to the FFT 142 for conversion into the N individual channel signals.

An exemplary DSP demodulator 18-1-1 and modulator 18-2-1 are also shown in FIG. 2. The demodulator DSP 18-1-1 includes a TDM first-in first-out (FIFO) driver 180-1, a TDM FIFO receiver 182-1, a DSP central processing unit 184-1 and program memory 186-1. Similarly, the modulator DSP 18-2-1 includes a TDM FIFO driver 180-2, a TDM FIFO receiver 182-2, a DSP central processing unit 184-2 and program memory 186-2.

Indeed, the modulator and demodulator DSPs may share the same hardware architecture, with the only difference being the in the program which is enable in the program memory 186, which in turn may control whether the TDM receiver or TDM driver hardware is enabled.

Thus, in the DSP demodulator 18-1-1, only the TDM receiver 182-is enabled (as indicated by the dashed lines around the driver 180-1), since the demodulator 18-1-1 only receives data from the TDM bus 16. Likewise, only the TDM driver 180-2 is enabled in the DSP modulator 18-2-1, since it only transmits data on the TDM bus 16.

On the transmit side, the digital combiner 24 consists of a TDM dual port (DP) receiver 244, an inverse FFT 242, and deconvolutional digital filter 240. In a manner that is described below, the TDM DP receiver 244 reads each of the data samples off the TDM bus 16 in their assigned time slot, and provides them to the inverse FFT 242 in the required order.

The samples are then operated on by the inverse FFT 242 and deconvolutional filter 240, to provide the composite digital signal 25 (FIG. 1).

Figure 3:
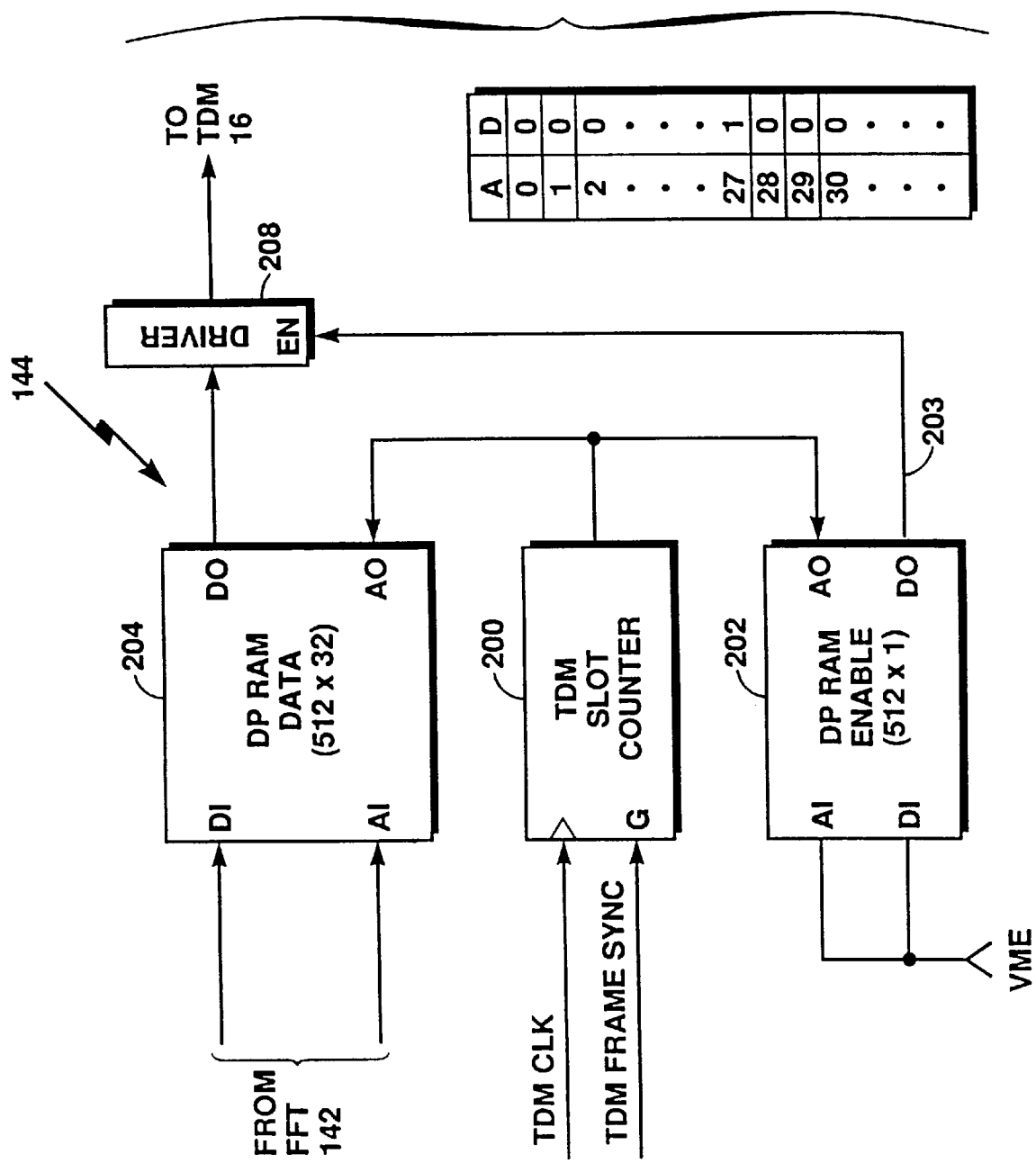
FIG. 3 is a detailed diagram of an addressable bus driver using a dual-port random access memory (DP-RAM)

Returning attention now to the channelizer 14, a detailed diagram of the TDM DP driver 144 is shown in FIG. 3. Briefly, it operates to assert the output samples from the FFT 142 in the proper time slots on the TDM bus 16. In order to simplify the implementation of the TDM bus 16, these time slots are fixedly assigned to particular channels (such as in ascending order by frequency and time slot number). Thus, a sample of a given one, k, of the N channel signals, will always appear in a particular time slot, k, when it is active.

The DP driver 144 consists of a TDM slot counter 200, a first Dual Port Random Access Memory (DP-RAM) referred to as the enable DP-RAM 202, a second DP-RAM referred to as the data DP-RAM 204, and a driver 208 having an enable input EN.

As is conventional, each of the DP-RAMs have two separate address and data ports for reading and writing data, namely, input address and data ports AI and DI, and output address and data ports AO and DO.

In operation, the TDM slot counter 200 receives a pair of signals generated by the TDM synchronization circuit 32 (FIG. 1). The first signal, TDM CLK, is a digital clock signal identifying the clock periods, or time slots, on the TDM bus 16. The second signal is a TDM FRAME SYNC signal, indicating when a new frame starts on the TDM bus 16.

The TDM slot counter 200, which is a standard digital counter, receives the TDM FRAME SYNC signal at a reset input R, and the TDM CLK signal at a clock input (denoted by a chevron in the Figures). Thus, the TDM slot counter 200 continuously keeps track of which consecutively numbered slot on the TDM bus 16 is presently active.

According to the invention, the manner in which the signals are multiplexed onto the TDM bus 16 is changed, depending upon the bandwidth of channels in the modulation scheme being supported. In particular, the number of time slots per frame on the TDM bus 16 is adjusted, depending upon the bandwidth of the modulation of the air interface which is implemented.

Figure 4A:
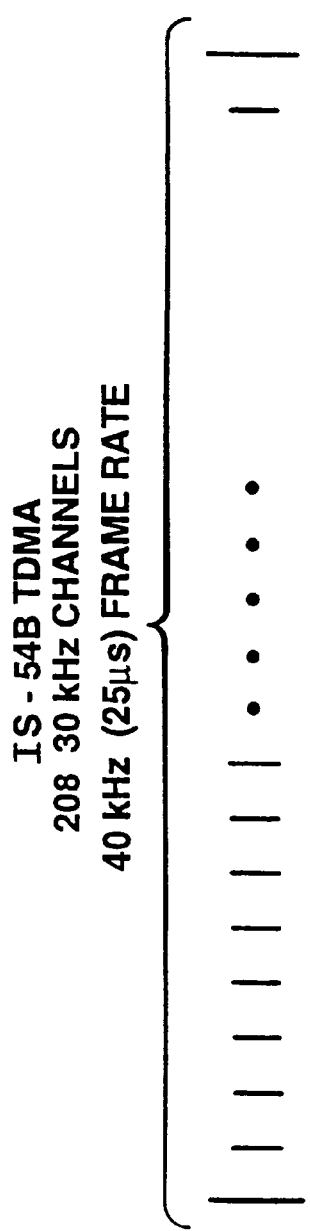
FIGS. 4A and 4B are timing diagrams showing the frame length and number of time slots on the TDM bus for two different channel bandwidths.
Figure 4B:
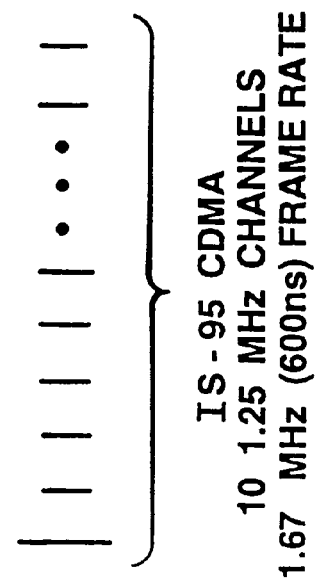

Thus, for different air interface standards, the TDM slot counter 200 will receive different TDM CLK and different TDM FRAME SYNC signals. Turning attention briefly to FIGS. 4A and 4B, this concept will be better understood. As shown in FIG. 4A, for the IS-54B TDMA standard, the channelizer 14 provides 208 channels, each having a 30 kHz bandwidth. The desired complex-valued (e.g., in-phase and quadrature) sampling rate of each TDMA channel is approximately 40 kHz, so that the frame rate, that is, the rate at which each group of 208 samples is asserted on the TDM bus 16, is also set to 40 kHz.

Accordingly, in order to support IS-54B channels, the TDM FRAME SYNC signal is controlled by the TDM synchronization clock generator 32 to reset the TDM slot counter 200 every 1/40 kHz, or every 25 μs, and the TDM CLK signal is set to clock the complex-valued samples, one from each of the 208 channels, every 25 μs/208; in other words, to provide approximately one TDM time slot every 121 ns.

As shown in FIG. 4B, for the IS-95 CDMA standard, the channelizer provides 10 channels, each having a 1.25 Mhz bandwidth. The desired complex-valued sampling rate of each channel is approximately 1.67 MHz, so that the frame rate is 600 ns.

Accordingly, in order to support IS-95 channels, the TDM FRAME SYNC signal is controlled to reset the TDM slot counter 200 every 600 ns, and the TDM CLK signal is set to clock the complex-valued samples, one from each of the 10 channels, every 600 ns/10, or to provide approximately one TDM time slot every 60 ns.

As shown in FIG. 1, the TDM synchronization clock generator receives appropriate signals from the basestation controller 30 via the VMS bus 17 indicating the desired TDM CLK and desired TDM FRAME SYNC rate.

The manner in which data may be asserted on the TDM bus 16 in any of the time slots will now be described in detail. In particular, the enable RAM 202 generates an enable signal 203 indicating when the TDM DP driver 144 may assert data on the TDM bus 16. The AI and DI inputs to the enable DP-RAM 202 are typically written into by the basestation controller 30 during the process of setting up a new call. In particular, as shown in the table depicting the contents of the enable DP-RAM 202, a location in the RAM is associated with each time slot on the TDM bus 16 (e.g., if the TDM bus contained 512 time slots, then the RAM 202 has 512 locations).

A logical "0" in the associated enable DP-RAM 202 location indicates that the TDM driver is inactive in the time slot, that is, no data is to be asserted at that time. A logical "1" in the associated location indicates that the time slot has been assigned to this particular TDM driver 144.

Thus, to enable a connection through the TDM bus 16, one step for the basestation controller 30, via the VME bus 17, is to write a logical "1" into the DP-RAM 202 location "x" associated with the newly enabled digital channel signal "x". In the example, shown, a "1" has been written at locations "27" and "30", indicating that this particular TDM driver 144 is now active in timeslot numbers 27 and 30.

The data DP-RAM 204 acts as a buffer, writing the digital channel signal samples output by the FFT at the DI input of the data DP-RAM 204. The DP-RAM 204 then stores the data samples until addressed by the TDM slot counter at the output side.

A data dual port (DP) RAM 204 is as a buffer in the case of processing the FFT output. This is because although the samples do come in bursts, or frames, the samples are not necessarily provided by the FFT 142 in the same order as they must be output onto the TDM bus 16. This is a particular phenomenon of at least one of the channelizer algorithms used. Thus, an address associated with each output sample from the FFT is used to determine at which location each sample is written in the data DP-RAM 204.

Figure 5:
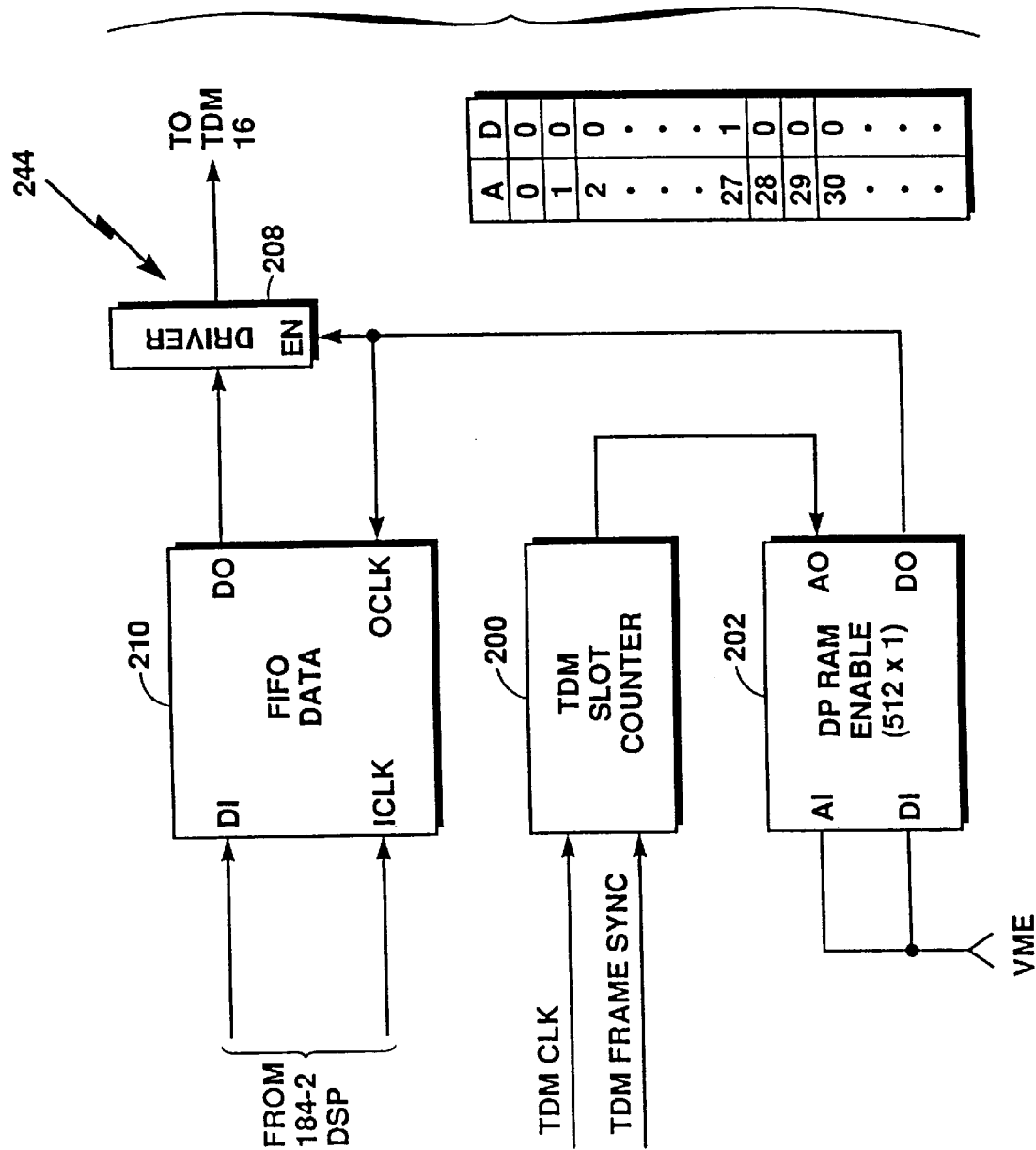
FIG. 5 is a detailed diagram of an addressable bus driver using a first-in, first-out (FIFO) memory.

However, the input data is already in the correct order for the TDM FIFO driver 180-2 used by the DSP modulator. Such a TDM driver 180-2 can thus use a first-in first out memory (FIFO) 210 in the place of a data DP-RAM. As shown in FIG. 5, the configuration and operation of such as TDM FIFO driver 180-2 is somewhat similar to the DP driver 144.

In particular, the TDM slot counter 200, enable DP-RAM 202 and driver 208 operate in the same way as for the embodiment of FIG. 3. The only difference is in the connection of the clock signals to the FIFO 210. On the input side, a clock signal is provided by the data source (e.g., the DSP processor 184-2) to cause data to be stored in the FIFO. The signal from the enable DP-RAM 202 is used to clock the FIFO output, DO.

Figure 6:
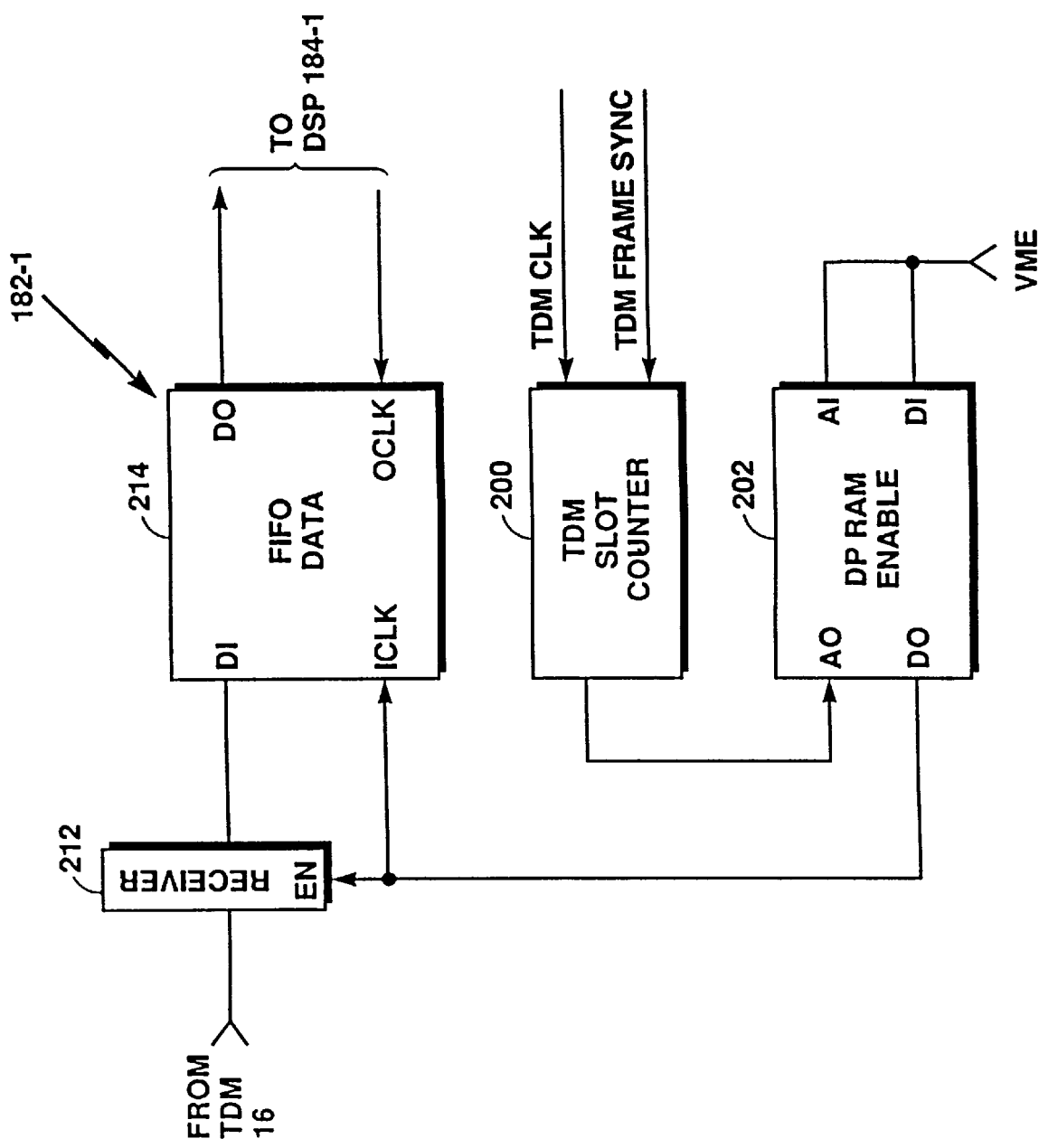
FIG. 6 is a detailed diagram of an addressable bus receiver using a FIFO.

A detailed diagram of the TDM FIFO receiver 182-1 is shown in FIG. 6. It includes a TDM slot counter 200, enable DP-RAM 202, bus receiver 212, and FIFO 214. The TDM slot counter 200 and enable DP-RAM 202 operate as for the TDM FIFO driver 180-1 shown in FIG. 5, to identify when the receiver 212 is to be active. The FIFO 214 is connected to the output of the receiver 212, having its input port connected to the enable DP-RAM 202 output. The output side of the FIFO is clocked as needed by the destination for the data (such as the DSP processor 184-1 in FIG. 2).

Figure 7:
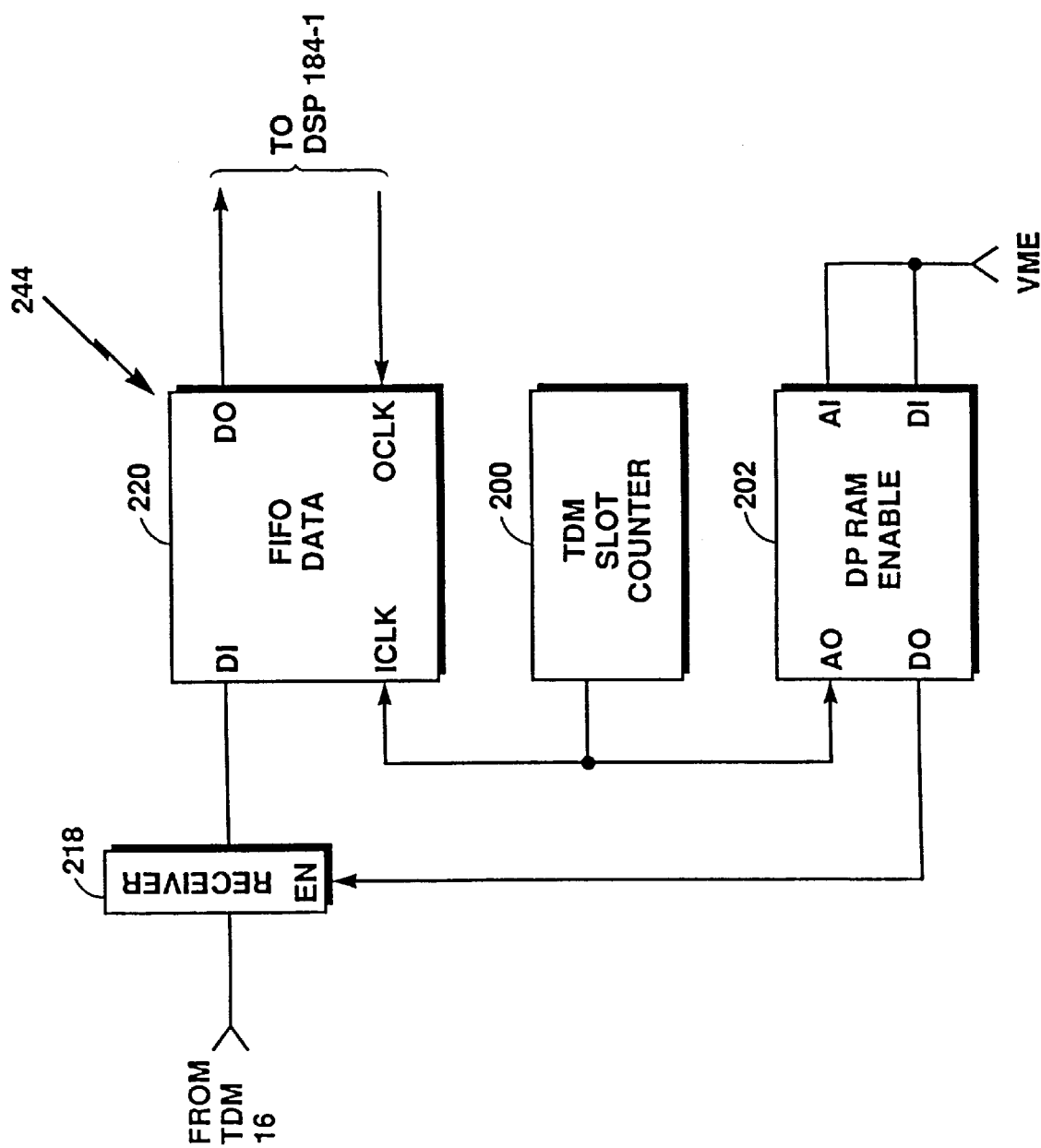
FIG. 7 is a detailed diagram of an addressable bus transmitter using a FIFO.

The TDM DP receiver 244 is shown in detail in FIG. 7. As for each of the other driver/receivers, it includes a TDM slot counter 200, enable DP-RAM 202. It includes a data DP-RAM 220 operating similarly to the data DP-RAM in the TDM DP driver 144 (FIG. 3) and bus receiver 218.

With this background in mind, the details of how the basestation control processor 30 effects the switching operation of the TDM bus 16 can now be better understood.

Figure 8:
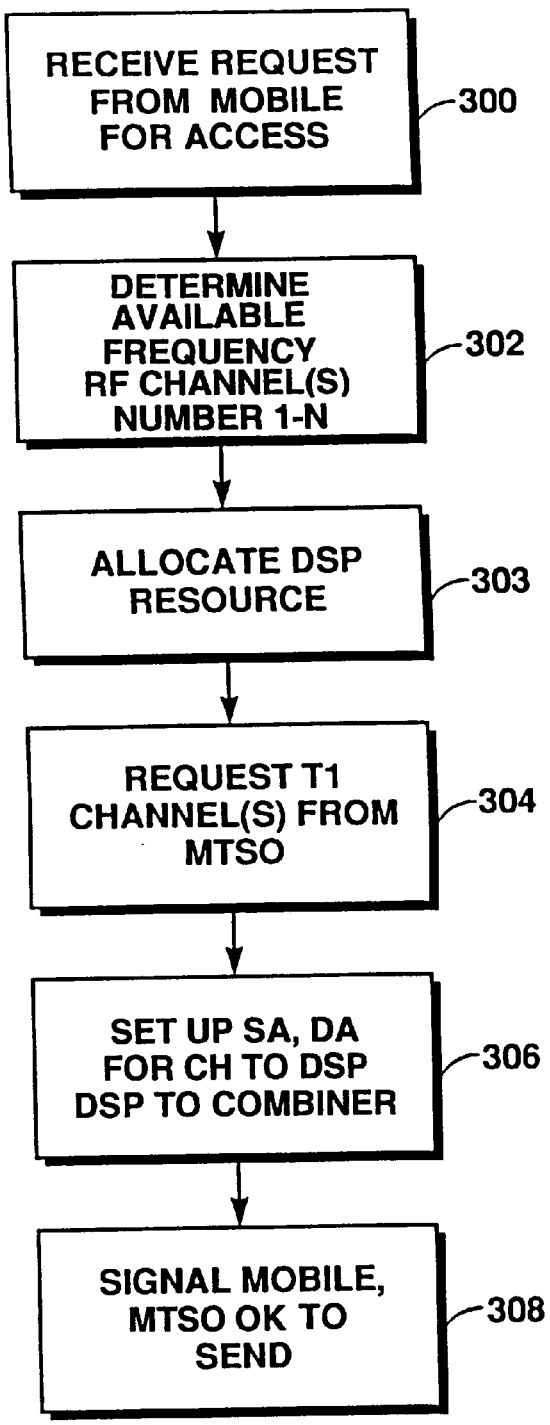
FIG. 8 is a sequence of operations performed by a basestation control processor in setting up a connection.

FIG. 8 is a flowchart of these operations. This sequence of steps is initiated (step 300) when the basestation controller 30 receives control signals from the mobile 40 (FIG. 1) indicating that the mobile wishes to have access to the PSTN. The controller 30 then determines whether a free transmit and receive frequency (step 302) are available among the N channels.

An available modulator DSP and demodulator DSP resource are then identified (step 303) by examining a list 33 of free DSP resources maintained in a memory portion 31 of the basestation controller 30 (FIG. 1). The list 33 is updated by removing the two DSPs once allocated.

Access to an MTSO T1 channel (e.g., access to one or more T1 time slots as needed on a particular T1 span line) is then requested from the MTSO by issuing the appropriate MTSO control signaling (step 304). The MTSO then returns T1 span and time slot identifiers to be used for the transmit and receive channels for this connection.

In the next step (306), the appropriate destination and source information is written into the various TDM bus drivers and receivers.

In particular, given a receive channel identification, a receive channel signal time slot on the TDM bus is thus identified. The corresponding location of the enable DP-RAM 202 in the TDM DP driver 144 associated with this time slot is then set to a logical "1" in the manner already described.

Next, a logical "1" is also written into the enable DP-RAM in the TDM receiver 182-1 associated with the DSP demodulator 18-1 which was identified as being an available resource. If the per-channel bandwidth is greater than that which can be supported by a single timeslot, then a sufficient number of logical "1"s are written into the appropriate locations.

Also, now given a transmit channel identification, the free DSP modulator 18-2 is enabled (step 306) to use the TDM bus 16, by writing a logical "1" into the enable DP-RAM of the TDM driver 180-2 connected to the available one of the DSP modulators 18-2. To complete the connection, a logical "1" is also written into the location of the TDM DP receiver 244 associated with the identified transmit channel.

Finally (step 308), the basestation controller 30 issues control signals to the mobile 40 and MTSO to indicate that the connection has been set up.

The invention can also be used to advantage in implementing a basestation 10 which simultaneously services mobiles 40 which use different air interface standards. That is, the basestation 10 may at the same time process signals from a first mobile 40a which uses TDMA (IS-54B) signaling, as well as a second mobile 40b which uses CDMA signaling (IS-95).

Figure 9:
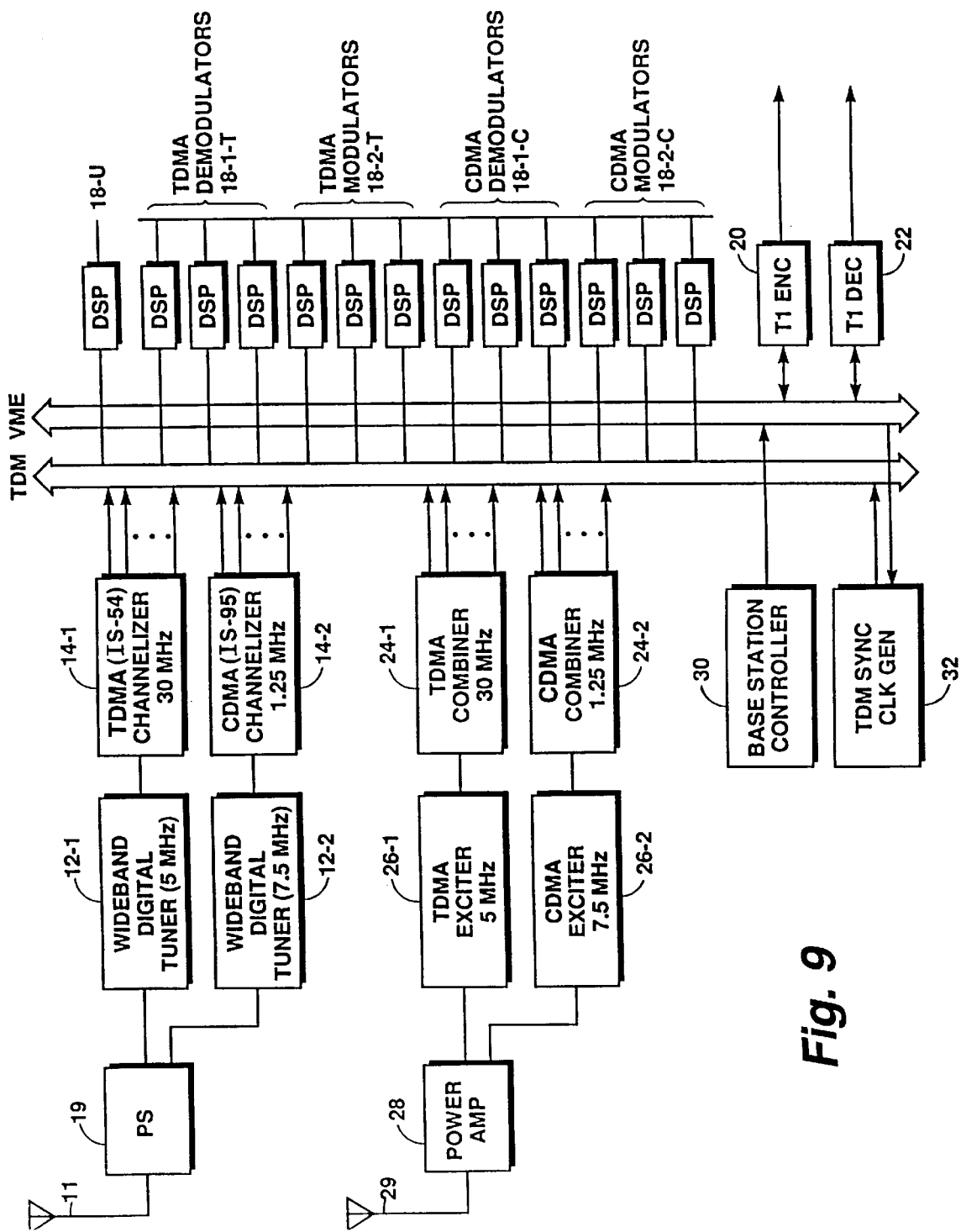
FIG. 9 is an alternate embodiment of the invention making use of multiple tuners and channelizers to support multiple air interface standards while making maximum use of basestation resources.

As shown in FIG. 9, to support this implementation, the basestation 10 includes a pair of wideband digital tuners 12-1, 12-2. The first digital tuner 12-1 downconverts a bandwidth, such as 5 MHz, from an RF bandwidth which is occupied by TDMA signals. A second digital tuner section 12-2 downconverters a bandwidth, such as 7.5 MHz, which is occupied by CDMA signals.

Next, the tuners 12-1, 12-2 forward the downconverted signals to respective channelizers 14-1, 14-2. The TDMA channelizer 14-1 is configured to separate the received signal into the 30 kHz bandwidth channels specified by IS-54B. Likewise, the CDMA IS-95 channelizer 14-2 is configured to provide 1.25 MHz channels as specified by that standard.

The TDM synchronization clock generator 32 is appropriately set to provide a sufficient number of time slots on the TDM bus 16 to permit transmission of both the required number of samples from the TDMA channelizer 14-1 as well as the required number of samples from the CDMA channelizer 14-2.

The modulators and demodulators are then grouped according to the air interface modulation they must deal with. For example, at any given instant in time, a certain number of DSPs 18-1-T will have been allocated to operate as demodulators for the TDMA channels provided by the TDMA channelizer 14-1. A different set of DSP processors 18-1-C will be serving as demodulators for the CDMA channels provided by the CDMA channelizer 14-2. The active modulator DSPs will likewise be so allocated.

Thus, assuming that each of the DSPs 18 can be configured to execute either a TDMA modulation/demodulation program or a CDMA modulation/demodulation program by simply accessing the correct program memory, the available DSP resources and TDM bus time slots are only allocated as needed.

In other words, the DSPs (and associated T1 connections, for that matter) are allocated according to user demand automatically, and without intervention by the service provider. Thus, for example, as more customers migrate to using CDMA, additional CDMA channels are automatically made available and processed by the DSPs, at the expense of the unused TDMA channels.

A number of advantages can now be see for a basestation 10 configured according to the invention.

When the basestation is to receive and transmit channel signals having a bandwidth as dictated by a particular modulation or air interface standard to, the TDM bus is reconfigured accordingly, to provide the required number of bus time slots, as well as to provide a frame repeat rate approraite to support the required per-channel sampling rate.

When, at a different time, the basestation is to support a protocol having a larger number of narrower bandwidth channels, the bus timing circuits are reconfigured to provide a correpondingly larger number of time slots at a slower frame rate. Likewise, when the basestation is to support a protocol which has a smaller number of wider bandwidth channels, the bus timing circuits are again reconfigured to provide a smaller numnber of time slots at the higher required frame rate.

By disposing the TDM bus 16 between the output of the wideband digital channelizer 14 and the demodulator DSPs 18-1, the demodulator DSPs 18-1 may be allocated only as needed. Similarly, the modulator DSPs 18-2 are allocable as needed, since the TDM bus 16 is disposed between them and the digital combiner 24 as well.

Thus, if the basestation 10 is expected to service only a small number of channels, a correspondingly small number of modulator and demodulator DSPs can be installed in the basestation 10. As the basestation's demands increases, these additional RF channels can be serviced by simply adding more DSPs, and without having to reconfigure the RF front end.

Another advantage is provided in that this switching functionality is distributed at the basestation level as much as possible. In particular, unlike certain prior cellular signal switching techniques, the MTSO need not be concerned with the details of how the mobile units 40 are connected through the basestation. Indeed, the MTSO need not even know or care about which transmit and receive frequencies have been assigned to a particular mobile. All the MTSO need provide is identification of a T1 transport line and time slot on which it expects to receive and provide signals from and to the mobile.

Furthermore, because the basestation may efficiently allocate its demodulator/modulator resources, a number of different air interface standards may be supported by the basestation at the same time, without the need to determine in advance an exact plan for allocating receiver/transmitter resources for each air interface type. Upon detecting a request by a new mobile for access, the basestation simply determines the type of air interface used by the mobile, and then signals the appropriately programmed DSPs, or even initiates the DSPs to run a different modulator/demodulator program, as required to support the additional mobile.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A basestation for processing signals in a multiple mobile subscriber unit wireless communication system comprising:

means for converting signals, in the form of a composite radio frequency, RF, signal sent from a plurality of the mobile units, into a first set of multiple digital channel signal outputs, each said digital channel signal output corresponding to one of the signals received from one of the plurality of mobile units;

means for selecting a modulation scheme supported by the basestation at a specific time:

a plurality of digital signal processing means, for providing digitally processed channel signal outputs according to said selected modulation scheme being supported by the basestation at a specific time;

time division multiplex switching means, disposed between the means for converting signals and the plurality of digital signal processing means, the switching means for interconnecting any one of the multiple digital channel signal outputs to any one of the plurality of digital signal processing means; and time division multiplex synchronization timing means, coupled to control the time division multiplex means, to adjust and change a frame rate and a number of time slots per frame, depending upon a bandwidth of the selected modulation scheme being supported by the basestation.

2. The basestation according to claim 1, wherein the means for converting signals further includes:

wideband digital tuner means, for downconverting a selected bandwidth of the composite radio frequency, RF, signal to an intermediate frequency, IF, signal, and for performing an analog to digital conversion on the IF signal, to provide a wideband digital tuner output signal; and digital channelization means, coupled to receive the wideband tuner output signal, for providing the first set of multiple digital channel signal outputs, the digital channelization means being adjustable such that each digital channel signal output to the time division multiplex switching means has a predetermined channel bandwidth, such that each digital channel signal output is output during a corresponding time slot associated with that digital signal channel output onto the time division multiplex switching means.

3. The basestation according to claim 2, wherein the digital channelization means is controlled by outputs from the time division multiplex synchronization timing means, at least one output identifying time slots occurring on the time division multiplex switching means such that there is one time slot per digital channel signal output, and at least one other output indicating when a new frame starts on the time division multiplex switching means.

4. The basestation of claim 1 wherein the signals received from the mobile units contain modulation, and the digital signal processor means include demodulators to remove the modulation.

5. The basestation of claim 1 additionally comprising signal-transport encoding means, connected to the output of the digital signal processing means, for encoding the digitally processed channel signal outputs for further transmission to a mobile telephone switching office, MTSO.

6. The basestation of claim 5 wherein the signal-transport encoding means is a T1 encoder.

7. The basestation of claim 2 additionally comprising:

second digital channelization means, being connected to receive the wideband tuner output signal, and providing a second set of multiple digital channel signal outputs, each one of the second set of the digital channel signal outputs having a predetermined channel bandwidth which is different from the predetermined channel bandwidth of said first set of digital channel signal outputs, and each one of the second set of multiple digital channel signal outputs corresponding to one of the signals received from one of the mobile units.

8. The basestation of claim 2 additionally comprising:

second wideband digital tuner means, for downconverting a second selected bandwidth of the composite radio frequency RF signal to a second intermediate frequency, IF, signal, and for performing an analog to digital conversion on the second IF signal, to provide a second wideband digital tuner output signal; and second digital channelization means, coupled to receive the second wideband digital tuner output signal, and providing a second set of multiple digital channel signal outputs, each one of the second set of the digital channel signal outputs having a predetermined channel bandwidth which is different from the predetermined channel bandwidth of said above mentioned first set of digital channel signal outputs, and each one of the second set of digital channel signals corresponding to one of the signals received from one of the mobile units.

9. A basestation as in claim 1 wherein the first and second set of digital channel signal outputs are modulated in accordance with first and second air interface standards, respectively.

10. A basestation as in claim 9 wherein the digital signal processors include a first set of digital signal processor means for demodulating said first set of digital channel signal outputs, and a second set of digital signal processors for demodulating said second set of digital channel signal outputs.

11. A basestation as in claim 9 wherein said first and second air interface standards are each a different one of a time division multiplex, TDMA, code division multiplex, CDMA, Advanced Mobile Phone System, AMPS, Personal Communications System , PCS, or Groupe Especiale Mobile, GSM.

12. A basestation as in claim 1 additionally comprising:

basestation controller means, connected to the time division multiplex switching means and the digital signal processing means, for maintaining a list of unused digital signal processing means that are not presently interconnected through the time division multiplex switching means to one of the digital channel signal outputs, and for dynamically allocating digital signal processing means from the list of unused digital signal processing means to be interconnected to one of the digital channel signal outputs only when the digital channel output contains an active signal being transmitted by the mobile unit which has not yet been assigned to one of the digital signal processing means.

13. A basestation as in claim 1 wherein the time division multiplex switching means further comprises:

a time division multiplex, TDM, data bus including data lines;

basestation controller means, connected to the TDM bus, and to generate TDM bus synchronization signals and driver address signals, the TDM bus synchronization signals used to identify access timeslots on the TDM bus; and TDM bus driver means, connected to the TDM bus, the basestation controller means, and at least one of the digital channel output signals, for receiving the TDM bus synchronization signals and the driver address signals, for storing the driver address signals, and for asserting the at least one digital channel output signal on the TDM bus when the value of driver address signals corresponds to the value of the bus synchronization signals, thereby indicating that a timeslot associated with the at least one digital channel output signal is currently active.

14. A basestation as in claim 13 wherein the basestation controller means, connected to the TDM bus, additionally generates receiver address signals, and the time division multiplex switching means additionally includes:

TDM bus receiver means, connected to the TDM bus, the basestation controller means, and at least one of the digital signal processor means, for receiving the TDM bus synchronization signals and the receiver address signals, for storing the receiver address signals, and for reading a signal asserted on the TDM bus and providing such asserted signal to the digital signal processor means when the value of receiver address signals corresponds to the value of the bus synchronization signals, indicating that a timeslot associated with the digital signal processor is currently active.

15. A basestation as in claim 8 wherein the first and second channelizers each comprise:

a convolutional digital filter, connected to receive the respective one of the digitized wideband signals; and a fast Fourier transform, FFT, processor, connected to receive the output of the convolutional digital filter, and to provide the digital channel signal outputs.

16. A basestation as in claim 1, further comprising:

a second plurality of digital signal processing means, connected to receive digital input signals from a communication signal source;

a wideband digital combiner, being connected to receive a second plurality of digital channel signals, and to provide a composite digital signal for transmission;

wherein the time division multiplex switching means is also disposed between the second plurality of digital signal processors and the wideband digital combiner, the switching means connecting any one of the second set of digital signal processors to any one of the digital channel signals input to the combiner;

a wideband digital exciter, connected to receive the composite digital signal and to provide a combined RF signal; and a transmit antenna, connected to receive the combined RF signal and the radiate the combined RF signal.

17. A basestation as in claim 16, additionally comprising:

basestation controller means, connected to the time division multiplex switching means and the first and second plurality of digital signal processing means, for maintaining a list of all unused digital signal processing means that are not presently interconnected through the time division multiplex switching means to one of the digital channel signal outputs, and for dynamically allocating digital signal processing means from the list of unused digital signal processing means to function as one of the first or second digital signal processing means only when the digital channel signal output contains an active signal being transmitted by the mobile unit which has not yet been assigned to one of the digital signal processing means, or when the digital input signals from the communications source are active.

18. A basestation for processing signals in a multiple mobile subscriber unit wireless communication system, comprising:

means for selecting a modulation scheme supported by the basestation at a specific time;

digital channelization means, connected to receive a composite signal containing signals received from a plurality of mobile subscriber units, for filtering the composite signal to generate a plurality of digital channel signal outputs in response thereto, the digital channelization means having a selectable channel bandwidth for each such digital channel signal output depending upon an air interface standard being supported by the basestation;

a plurality of digital signal processing means, for providing digitally processed channel signal outputs according to said selected modulation scheme being supported by the basestation at said specific time;

time division multiplex switching and synchronization means, disposed between the digital channelization means and the plurality of digital signal processing means and interconnecting any one of the plurality of digital channel signal outputs to any one of the plurality of digital signal processing means;

wherein the digital channelization means and the time division multiplex switching and synchronization means are coupled such that each is driven by common parameters including a frame rate and a number of time slots per frame, the common parameters determining which digital channel signal is interconnected between the digital channelization means and a digital signal processing means at any one moment in time, and said parameters being determined by the air interface standard being supported by the basestation.

19. The basestation according to claim 18, wherein:

the time division multiplex switching and synchronization means includes:

a time division multiplex synchronization means; and
a time division multiplex switching means; and wherein the common parameters are produced by a time division multiplex synchronization means and synchronize the digital channelization means and the time division multiplex switching means such that the digital signal channel outputs are multiplexed onto the time division multiplex switching means at a predetermined rate, depending upon the bandwidth of channels allocated in the modulation scheme being supported; and wherein the common parameters may be changed to allow the basestation to implement reception and transmission of a varying number of signals having varying bandwidth requirements, depending upon different air interface standards being supported by the basestation.

20. The basestation according to claim 19, wherein the common parameters may be adjusted to reconfigure the basestation to support at least two different air interface standards.

21. The basestation according to claim 20, wherein said at least two different air interface standards include at least one selected from the group comprising the IS-54B TDMA standard, the IS-95 CDMA standard, an Advanced Mobile Phone System, AMPS, standard, a Personal Communications System, PCS, standard, and a Groupe Especiale Mobile, GSM, standard.

* * * * *